United States Patent Office 3,794,548
Patented Feb. 26, 1974

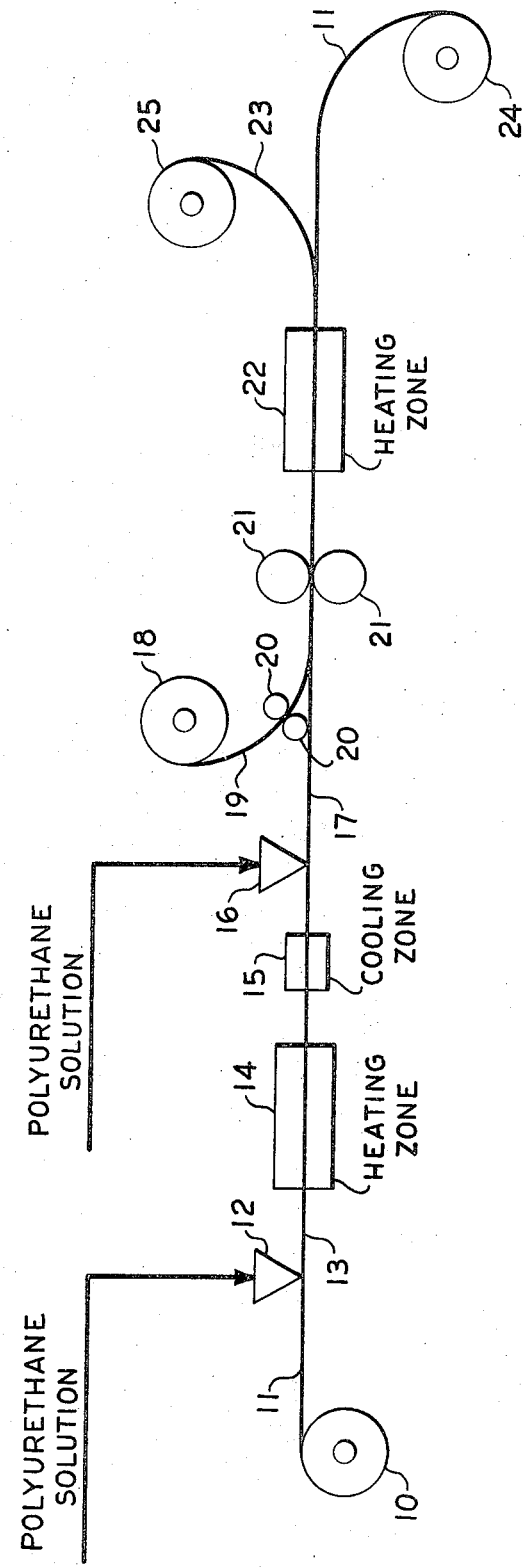

3,794,548
METHOD OF INTRODUCING BREATHABILITY TO A NON-POROUS CONTINUOUS PLASTIC FILM
Christian Wirth, Mount Holly, N.J., and George J. Albi, Far Rockaway, N.Y.; said Christian Wirth assignor to Hooker Chemical Corporation, Niagara Falls, N.Y.
Continuation-in-part of abandoned application Ser. No. 25,122, Apr. 2, 1970. This application Dec. 27, 1971, Ser. No. 212,041
Int. Cl. B32b 3/00
U.S. Cl. 161—89                    17 Claims

ABSTRACT OF THE DISCLOSURE

A porous, breathable, polymer film is produced by forming a substantially non-porous continuous polymer film on a support member, applying a layer of film-forming polymer composition to said non-porous film; and heating the resulting structure above the softening point of the non-porous film to form a unitary, porous breathable article comprised of both polymer layers. The first polymer film can be formed by applying to the support member a layer of a first film-forming flexible polyurethane solution comprising a polyurethane composition and diluent therefor. The support member can be stripped from the first polymer film. Coated fabrics can also be produced by applying a fabric material to the second layer before heating the resulting structure to form the unitary porous, breathable article.

REFERENCE TO PRIOR APPLICATION

This is a continuation-in-part of copending application Ser. No. 25,122, filed Apr. 2, 1970, now abandoned.

BACKGROUND OF THE INVENTION

Attempts to make porous coatings in the past have involved forming a polymer film and then mechanically perforating the film. The procedure involves additional steps and has not provided satisfactory porous polymer films. A new method for producing polymer film or polymer coated fabrics which have a uniform or controlled porosity and/or breathability is described in copending application Ser. No. 777,428, filed Nov. 20, 1968, now U.S. Pat. No. 3,650,880. The present invention provides a process by which the porosity and/or breathability of the films or fabrics of the copending application can be greatly increased.

It is the object of this invention to provide a method of introducing breathability into a non-oporus, continuous plastic film. It is also the object of this invention to produce polymer films or polymer coated fabrics which have uniform or controlled porosity and/or breathability. Another object of this invention is to provide said fabrics which are easy and economical to fabricate. A further object of this invention is to provide fabrics which are dry-cleanable and are abrasion resistant. A still further object is to provide fabrics which are resistant to water and common household solvents. Another object of this invention is to provide polymer films or polymer coated fabrics which have an aesthetic appeal.

SUMMARY OF THE INVENTION

This invention relates to a method of introducing porosity and/or brethability into a non-porous, continuous polymer film and to the porous, breathable, continuous polymer films thus produced and to polymer coated fabrics produced by applying fabric to the polymer films.

DESCRIPTION OF THE PREFERRED EMBODIMENTS

The process of the invention can be illustrated by reference to FIG. 1, which is a schematic flow diagram of one embodiment of the invention.

The process of the invention employs a supply roll 10 of a temporary support or carrier member or backing sheet or web 11 which is used during certain stages of the process. The carrier member or web, can be any suitable material from which the final composite fabric can be readily stripped mechanically, and which has a surface which possesses a low degree of adhesive affinity for the film-forming flexible polyurethane solution employed in this invention. Thus, the film-forming polyurethane solution does not wet the carrier member, i.e., the surface tension energy is higher than the interfacial energy. Web 11 may be a polished or textured metal band, or belt of fabric, or paper having a surface treated in any manner well known in the art to provide it with the desired surface characteristic and inertness against permanent integral bonding to the film-forming polyurethane solution, and heat resistant so as essentially not to be affected by the drying heat and so as to be strippably attached thereto. The carrier member should be solvent resistant and is preferably substantially non-porous.

A film-forming polyurethane solution is applied to the upper surface of the carrier by suitable discharge means; such as a reverse roller coater 12. Many solutions of a flexible polyurethane can be employed in this invention as described hereinafter. The film-forming polyurethane on the carrier is subjected to heat or drying. For this purpose, the coated carrier 13 is passed through one or more heating zones 14, such as heating ovens or heating plates, to remove the volatile component and form the desired non-porous polyurethane film. Various heating means that are commercially available can be employed, e.g., compartmented ovens equipped with hot gas ducts and distribution means, or heated by radiant heaters, and the like. The heating zone is maintained in the temperature range of about 35 to about 225 degrees centigrade, preferably about 50 to 205 degress centigrade. Preferably, a sequence of heating means of increasing temperature are employed. For example, a four compartment oven can be employed in which the temperatures are about 35° C. to about 80° C., about 80° C. to about 100° C., about 100° C. to about 150° C., and about 150° C. to about 225° C., respectively. When the coated carrier leaves the heating zone, it can be subjected to cooling by a suitable cooling means 15, if desired.

The coated carrier is then fed past another suitable discharge means 16, containing a film-forming polymer composition and a fluid layer of film-forming polymer composition is coated on the first film. The polymer composition can be a polyurethane solution which may or may not be the same as the first polyurethane solution. Deposition of either polyurethane solution onto the carrier can be accomplished by any well-known method, such as knife coating, brush coating, or spraying, and the like.

Any well-known knitted, woven, non-woven or stretchable textile fabric 19 is next applied from supply roll 18 through guide rolls 20 to the second layer of polyurethane while the latter is still in an adhesive condition. Generally, the fabric is allowed to rest by its own weight upon the coated carrier 17. Because of the adhesive properties of the polymer composition, it adheres to both the precast polyurethane film on the carrier and to the fabric material. In other words, after the second film-forming polyurethane solution has been cast onto the exposed surface of the pre-cast or first film which results from the drying in the heating means, and while the second film-forming coating is still in a solution, or adhesive state, the fabric is laid onto said second coating and sinks into the body of said second coating. If desired, an accurately controlled pressure can be applied to the fabric to bring it into more intimate contact with said second coating. If desired, the pressure on the material can be provided by suitable pressure rollers 21 and can be such as to force the fabric material to the required depth into the thickness of said second polyurethane solution.

After the fabric material has been laid on the carrier, the composite structure is fed through a second heating zone 22, of the type used before to remove any volatile compounds from the polyurethane solution to form the desired film. The second heating zone is maintained at a temperature above the softening point of the non-porous film and generally in the range of about 100 to 275 degrees centigrade, preferably about 150 to 225 degrees centigrade. The temperature is sufficiently high in the second heating zone to cause the diluent in the second polymer coating to form bubbles as it evaporates. These bubbles assist in the formation of pores in the softened non-porous film. While not desiring to be bound to theory, it is believed that the bubbles in the second coating pull material from the softened non-porous film to form holes or pores therein. Thus, the bubbles operate on the softened non-porous film so that the article resulting from the evaporation step is breathable. After leaving the heating zone, the composite material consists of the support with two cast films and the fabric. Integral and permanent adhesion is obtained between the two films. The fabric is also bonded with permanent adhesion to second polyurethane composition by chemical and/or mechanical adhesion. After leaving the heating zone, the support can be cooled and mechanically stripped in any well-known manner from the composite sheet 23 consisting of the superimposed films and fabric, and if desired the support 11 can be rerolled on a roller 24 for reuse in the process. The composite sheet is at the same time rolled on a suitable receiving roller 25.

Generally, but not necessarily, in continuous operation of the process, the support is continuously moved in an essentially horizontal plane and the solutions and fabric are applied to the upper surface of the web from fixed stations.

The polyurethanes are produced by reacting an organic polyisocyanate, generally a diisocyanate, with a selected polyol, usually a diol. Generally a polyether polyol or a polyester polyol is employed having a hydroxyl number in the range of about 30 to 200, preferably about 40 to 170. Generally, the polyethers are based on adducts of dihydric alcohols, such as ethylene glycol, reacted with ethylene oxide or other alkylene oxides to provide terminal hydroxyl groups. The polyesters employed are reaction products of a polycarboxylic compound, preferably a dicarboxylic compound, including acids, anhydrides and acid halides, such as adipic, succinic, glutaric and the like, with an alcohol, preferably a dihydric alcohol such as ethylene glycol, diethylene glycol, 1,4-butanediol, 1,6-hexanediol, and the like. A free unreacted glycol of similar type can be admixed with the polyester to vary the properties of the polyurethanes, if desired, up to about 2 moles of glycol per mole of polyester. Other hydroxyl containing polymers, such as polylactones and polycaprolactones can be employed. The flexible polyurethane employed is preferably elastomeric. Various diisocyanates can be employed in preparing the polyurethanes. Useful diisocyanates include diphenylmethane diisocyanate, hydrogenated diphenylmethane diisocyanate, toluene diisocyanate, n-hexyl diisocyanate, naphthalene diisocyanate and the like.

The polyurethane composition, or other polymer, employed in the first polymer film is selected so as to have two characteristics. The first characteristic is that the polymer film is substantially non-porous. By this is meant that the resulting film can contain some macropores, however, the number of pores will not be appreciable, i.e., will be insufficient to classify the film as porous and/or breathable. When a solvent or diluent is employed in applying the first polymer film, the non-porous condition of the film results when the solvent or diluent is evaporated. The second characteristic of the first polymer film is that the composition has a softening point of about 50 to about 230° centigrade, preferably about 100 to about 200° centigrade. The softening point is determined by preparing two cured films of 3±0.5 mils thickness on backing sheets. One of the sheets is of the type wherein the film cannot be stripped therefrom. The softening point is determined immediately, i.e., within one hour of curing. The two films are placed together and subjected to a source of controlled heat for 6 minutes under a pressure of 80 grams per square inch and then allowed to cool. The temperature at which the two films cannot be pulled apart is the softening point. Polymer compositions having the foregoing characteristics can be obtained in various manners. In the case of polyurethanes, the composition can be produced by reacting a particular polyol with a particular organic polyisocyanate or by reacting a mixture of various polyols with one or more organic polyisocyanates or by increasing the crystallinity or the cross-linking density of a polyol-polyisocyanate system. Increasing the crystallinity of cross-linking density can be accomplished by methods known in the art. For example, the cross-linking density can be increased by employing a cross-linking agent such as an organic triisocyanate. Typical triisocyanates include 2,4,6-toluene triisocyanate, 4,4',4''-triphenyl methyltriisocyanate, polyarylpolyisocyanates such as polymethylene polyphenylisocyanates which are reaction products of trihydric alcohols and diisocyanates, such as the adducts of trimethylol propane and toluene diisocyanate or hexamethylene diisocyanate or methylene bis(cyclohexylisocyanate), and the like. The polyisocyanates may or may not be blocked.

The polymer compositions in either or both of the first and second coatings can be polyurethanes of the foregoing type although the polyurethane need not be identical in both coatings. The polyurethane employed in the first coating need not be in solution, but can be in the form of a calendered film, or can be in the form of the reactive monomeric components set forth hereinbefore that react to form the polyurethane.

Other polymers that can be employed in the first or second polymer coating include a vinyl polymer or copolymer, a polymer of the acrylic family, i.e., polymers of acrylic acid and its derivatives, cellulose esters, polyamides, polyesters or the like. Representative vinyl polymers and copolymers include poly(vinyl chloride); poly(vinylidine chloride); poly(vinyl acetate); poly(vinyl acetals) such as poly(vinyl butyral), poly(vinyl ketals) such as those derived from cyclohexanone; poly(vinyl ethers) such as poly(vinyl methylether), poly(vinyl isobutyl ether), poly(vinyl stearyl ether), and the like; poly(vinyl aldehydes and ketones) such as poly(methylvinyl ketone), poly(isopropenyl methyl ketone, acrolein (acrylic aldehyde), and the like; nitrogen-containing vinyl polymers such as poly(N-vinyl carbozole), poly(N-vinyl pyrrolidone), poly(N-vinyl pyridine), and the like; and the like vinyl polymers. Copolymers of the foregoing vinyl polymers can also be employed.

The polymers of the acrylate family include polyacrylic acid and its esters, alpha-haloacrylic acid and its esters, acrylonitrile, acrylyl halides, amides anhydrides and anilides. Typical compounds include polyacrylic acid, polymethacrylic acid, poly(methyl acrylate), poly(ethyl acrylate), poly(butyl acrylate), poly(n-hexyl acrylate), poly(1,1 - dihydroperfluorobutyl acrylate), poly(benzyl acrylate), poly(cyclohexyl acrylate), poly(phenylethyl acrylate), poly(chloroacrylate), poly(fluoroacrylate), poly(methylmethacrylate), poly(ethyl methacrylate), poly(butyl methacrylate, poly(cyclohexyl methacrylate), poly(lauryl methacrylate, poly(ethylene methacrylate, poly(n-amyl methacrylate), poly(ethylenediglycol diacrylate), polyacrylamide, polymethacrylamide, polymethacrylamide, polyethylmethacrylamide, and the like.

Cellulose esters useful in the invention include cellulose acetate, cellulose propionate, cellulose butyrate, cellulose nitrate and mixed esters such as cellulose acetate butyrate.

The polyamides which are useful in the process of this invention are prepared by condensing dicarboxylic acids or acid halides, such as those disclosed hereinbefore, with a diamine such as hexamethylenediamine or by the polymerization of amino acids to form, in either case, long polyamide chains. Typical polyamides include the product of hexamethylene diamine and adipic acid, polycaprolactam, the product of hexamethylenediamine and sebacic acid, poly(11-aminoundecanoic acid), poly(12-aminododecanoic acid) and the like. The polyesters are reaction products of a polcarboxylic compound and an alcohol which has been described hereinbefore.

The polyurethane and other polymer compositions are generally employed as a solution or dispersion in an inert liquid diluent or carrier. The solutions or dispersions can also contain catalysts, such as tertiary amines, surface active agents such as silicones, and other additives, such as talc, carbon black, dyes, colorants, fillers and flame retardants. For the polyurethanes, the liquid diluent is generally a combination of an alkylamide, an aromatic hydrocarbon or an aliphatic ketone. Suitable alkylamides have the formula

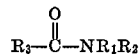

wherein $R_1$ and $R_2$ are alkyl, and $R_3$ is selected from the group consisting of hydrogen and alkyl. The alkyl groups generally have 1 to about 6 carbon atoms. Typical amides that can be used in the practice of the invention include: dimethylformamide, diethylformamide, dipropylformamide, methylhexylformamide, dimethylacetamide, diethylacetamide, methylhexylacetamide, and the like. Mixtures of any of the foregoing amides can also be employed. Suitable aromatic hydrocarbons include benzene, toluene, xylene, ethylbenzene, and the like. Suitable aliphatic ketones have 3 to 9 carbon atoms and include acetone, methyl ethyl ketone, diethyl ketone, methyl propyl ketone, dibutyl ketone, and the like. Other less preferred diluents include dimethylsulfoxide, tetrahydrofuran and cyclohexanone. The diluent for the polyurethane can also be a non-solvent such as butyl lactate, water, alcohols such as methanol and ethanol, and the like. Mixture of any of the foregoing carriers can also be employed. Concentration can vary depending on the choice of diluents, but will generally be in the range of about 10 to 60 weight percent solids, preferably about 15 to 40 weight percent solids based on the weight of the solution. The diluents employed with vinyl polymers are those normally employed in plastisols, such as, tricresyl phosphate, dioctyl phthalate, dibutoxyethyl phthalate, dibutyl phthalate, glycerol esters, ricinoleates, and the like. Similarly the other polymers are employed with solvents or diluents that are compatible therewith.

The invention is not limited to any particular kind of fabric material and, in general, porous material such as knitted goods, woven textiles or non-woven textiles, can be used. The fabric can be made of natural or synthetic fibers, such as cellulosic fibers, jute, cotton, wool, nylon, polyester, rayon, polyurethanes, acrylics and polyolefins. Moreover, other cellulosic materials can be used as the fabric material, such as paper, cardboard, and the like. Also useful foamed materials such as expanded vinyl foamed polyurethane and foamed rubber sheets. "Opencelled" foams are preferred.

In the process of the invention, the evaporation rate of the diluent of the polymer composition is controlled to give the desired size and density of pores in the unitary article. The evaporation rate is a function of the drying temperature and temperature gradient, the choice of diluents used, concentration, film thickness, and removal of evaporation diluent from the environment of the drying film. Removal of the diluent vapors is facilitated by passing air or other inert gas through the drying means, so that air velocity and air quality also affect evaporation rate. The configuration of the heating zones also affects the evaporation of the volatile components. Residence time in the heating zones is dependent on the temperature of the heating zones, the polyurethane film thickness and the diluents employed, but is generally in the range of about 0.5 to 20 minutes, preferably about 1 to 10 minutes.

The plastic films and plastic coated fabrics of the invention are breathable in that they are readily permeable to air and other gases, and to the vapors of water and other liquids. The films and coated fabrics are substantially repellant to liquid phase water and other liquids due to the nature of the pores and character of the plastic surfaces. The total thickness of the coating layers and the thickness of each individual layer can be varied considerably. Generally, the total coating thickness is in the range of about 1 to 30 mils, preferably about 2 to 10 mils. Each of the coating layers is continuous in the sense that they are continuously applied along the length of the web or support member as opposed to intermittent application.

The following examples are presented to illustrate the invention. It is understood that the examples are not to be construed as limiting the invention. In this specification and claims, all temperatures are given in degrees centigrade and all parts are by weight unless otherwise indicated.

EXAMPLE 1

A polyurethane coating solution was prepared of components comprising 34.9 parts of a solution comprised of about 155 parts of a thermoplastic polyurethane of a linear, hydroyl-terminated butane diol-adipate polyester of 700 molecular weight, butanediol, isopropanol and hydrogenated diphenylmethane diisocyanate in solution in a mixture of 139 parts of dimethylformamide and 139 parts of xylol; 24.1 parts of a solution comprised of about 154 parts of a polyurethane of a linear, hydroxyl-terminated butane diol-adipate polyester of 700 molecular weight, butanediol, hexanetriol and hydrogenated diphenylmethane diisocyanate in solution in a mixture of 139 parts of dimethylformamide and 139 parts of xylol; 3.2 parts of the adduct of trimethylol propane and methylene bis(cyclohexylisocyanate); 13.4 parts of a color concentrate; 1.7 parts of cellulose acetate butyrate; 11.3 parts of dimethylformamide and 11.3 parts of toluene. The solution coated on an embossed release paper with a reverse roll coater. Thereafter, the solution was dried by drying the coated release paper through an 80 foot long heating oven at the rate of 8 yards per minute. The heating oven was divided into 3 zones each having a maximum air circulation of about 45,000 pounds per hour. The first zone was maintained at about 68 degrees centigrade; the second zone was maintained at about 99 degrees centigrade; and the third zone was maintained at about 118 degrees centigrade. The coated release paper was then passed through a second oven having a total length of 40 feet at the rate of 8 yards per minute. This oven maintained at about 175 degrees centigrade. The resulting structure comprised of the embossed release paper and 3 mils of dried, non-porous polyurethane coating, was passed under a knife over roller coater which applied a second polyurethane coating solution to the fabrication. The second polyurethane coating solution was prepared of components comprising 83 parts of a solution comprised of about 140 parts of a thermoplastic polyurethane of a linear, hydroxyl-terminated ethylene glycol-adipate polyester of 2000 molecular weight, butanediol, isopropanol and diphenylmethane diisocyanate in a solution of a mixture of 150 parts of dimethylformamide and 100 parts of toluene; 2 parts of dimethylformamide; 3 parts of toluene; and 6 parts of butyl lactate; and 6 parts of a color concentrate. Next, napped cotton drill was continuously laid with the napped side on the second coating solution and the coated paper was drawn through pressure rollers. The laminated structure was drawn through an 80 foot oven which had three zones. The first zone had a temperature of about 150 degrees centigrade; the second zone had a temperature of about 160 degrees centigrade; and the third zone had a temperature of about 170 degrees centigrade. Thereafter, the composite structure was cooled, the release paper was separated from the coated cotton drill and the paper and coated fabric were separately collected on supply rolls. The cotton drill had a polyurethane coating which was 5 mils thick. The composite fabric was breathable. The fabric was made into automobile seat covers and into furniture upholstery.

EXAMPLE 2

Example 1 was repeated except that brushed nylon tricot was employed in place of the cotton drill. The resulting coated nylon contained a polyurethane which was 4 mils thick. The coated nylon tricot was breathable and was used to make automobile seat covers and sport jackets.

EXAMPLE 3

Example 1 was repeated except that an open cell, foamed polyurethane sheet was employed in place of the cotton drill. The resulting structure has a 4 mil polyurethane coating on the foamed polyurethane sheet.

EXAMPLE 4

Example 1 was repeated except that a napped, knitted cotton fabric was laid on the wet film with the nap side adjacent to the wet film. When the composite was stripped from the release paper, the resulting coated fabric was abrasion resistant, resistant to water and common solvents, had aesthetic appeal, was dry cleanable, and had porosity and breathability.

EXAMPLE 5

The procedure of Example 1 was repeated twice except that no fabric material was employed. Also, in the second run, the polyurethane solution employed in both layers was the same as the second polyurethane solution employed in Example 1. The polyurethane films of both runs were stripped from the release paper and held up to a source of light. The breathable film of the present invention, i.e., the first run was observed to have greater microporosity, a better distribution of pores and smaller pores.

EXAMPLE 6

Example 1 was repeated except that no fabric material was employed. Breathability was measured by test method CCCT 191B-5452 on a Gurley densometer. The 3 mil dried, non-porous film required more than 1000 seconds to force 100 cc. of air through the film. The 5 mil porous film required 30 seconds to force 100 cc. of air therethrough. (Generally, the porous, breathable films of this invention require about one to about 300 seconds to force the 100 cc. of air through the film.)

The method of the invention was used to coat a fabric material with two layers of polyvinyl chloride as follows.

A first coating composition was prepared by blending 100 parts by weight of a vinyl chloride homopolymer having a low molecular weight as indicated by specific viscosity of 0.36 as determined by ASTM test D1243—Method B, 65 parts by weight of dioctyl phthalate, 5 parts by weight of the pigment concentrate (a metal compounded with a plasticizer and a wetting agent) and 2 parts by weight of cadmium-barium-zinc stabilizer. A second coating composition was prepared by blending 100 parts by weight of the same vinyl chloride homopolymer, 70 parts by weight of dioctyl phthalate, 2 parts by weight of the cadmium-barium-zinc stabilizer, 172 parts by weight of toluene and 172 parts by weight of butyl lactate.

The first coating composition was applied to a release paper normally used for polyurethanes at a rate of 3 ozs. per square yard, and the coating was gelled and fused to form a solid non-porous film. Thereafter, the second coating composition was applied at the rate of 3 ozs. per square yard (dry weight). Then a napped cotton fabric was applied to the wet second coat, after which the entire laminated article was dried. It was found that fine pores had formed through the first and second coating. The coated fabric was tested on a Gurley densometer and found to require 70 seconds to force 100 cc. of air through the coated fabric.

EXAMPLES 8–13

Coating compositions were prepared from various components in the proportions shown in Table I. In these examples, polymer A was a vinyl chloride homopolymer having a low molecular weight as indicated by a viscosity of 0.36 (ASTM D1243—Method B). Polymer B was a vinyl chloride homopolymer having a high molecular weight as indicated by a specific viscosity of 1.75 measured a 1% in cyclohexanone at 30° C. Polymer C was a co-polymer of vinyl chloride with vinyl acetate, having an inherent viscosity of 1.13 as determined by ASTM test D1243—Method A.

TABLE I

| Example No. | 8 | 9 | 10 | 11 | 12 | 13 |
|---|---|---|---|---|---|---|
| Components, parts by weight: | | | | | | |
| Polymer: | | | | | | |
| A | 100 | 100 | | | | |
| B | | | 100 | 100 | | |
| C | | | | | 100 | 100 |
| Dioctyl phthalate | 65 | 85 | 65 | 85 | 65 | 85 |
| Pigment concentrate | 5 | 5 | 5 | 5 | 5 | 5 |
| Cadmium-barium-zinc stabilizer | 2 | 2 | 2 | 2 | 2 | 2 |

For each of the foregoing polymer compositions set forth in Table I, a 2 to 3 mil coating of the polymer composition was applied to a release paper normally employed for polyurethane compositions; the composition was gelled and fused to form a solid non-porous film. Thereafter, a second coating composition corresponding to the second coating composition of Example 1 was applied to the first coating composition at a rate of 2 ozs. per square yard (dry weight) and the second coating was dried for 2 minutes at 400° Fahrenheit. In each example, the resulting dried films were porous and breathable and when tested on the Gurley densometer, it was found that 1 to 5 seconds were required to force 100 cc. of air through the films.

In each example, coated fabrics were prepared by laying down the first and second coating as described hereinabove except that a fabric was applied to the polyurethane second coating composition prior to the evaporation of the solvent. Then the entire laminates were dried to evaporate the volatile components therefrom. In each example, the resulting coated fabrics were found to be porous and breathable and when tested on the Gurley densometer, it was found that from 0.3 to 1.8 seconds were required to force 100 cc. air through the coated fabrics.

EXAMPLE 14

A polyurethane coating composition of Example I was applied to a release paper and dried to a non-porous film as described in Example 1. A second coating composition was prepared by blending 50 parts by weight of a aqueous emulsion of polyurethane containing 50 percent solids, 46 parts by weight of water, 4 parts by weight of an acrylic acid thickening agent (Rohm & Haas ASE60) and sufficient ammonium hydroxide to adjust the pH of the mixture to 8.5. The second coating composition was applied to the polyurethane non-porous film at a rate of 2 to 3 ounces per square yard (dry weight). Thereafter, a napped cotton fabric was layed on the wet second coating and entire laminated composition was dried at temperatures ranging 350 and 400 degree Fahrenheit at a rate of 10 yards per minute. The dried laminated article was found to be breathable and when tested on a Gurley densometer it was found that the coated fabric required 30 seconds to pass 100 cc. of air.

EXAMPLE 15

A polyurethane coating composition of Example 1 was applied to a release paper and dried to a non-porous film as described in Example 1. A second coating was prepared by blending 33.3 parts by weight of an acrylic acid polymer composition comprising 50 percent solids in a solvent composition comprising 15 parts by weight of cyclohexene, 30 parts by weight of isopropyl acetate and 55 parts by weight of oxylene, with 66.7 parts by weight of dimethyl formamide. The second coating composition was applied to the first non-porous polyurethane film at the rate of 2 to 3 ounces per square yard (dry weight). Then a napped cotton fabric was applied to the wet second coating and the resulting laminate was dried at temperature in the range of 350 to 400 degrees Fahrenheit at 10 yards per minute to evaporate the volatile components. The resulting coated article was breathable and when tested on the Gurley densometer it was found that 7 seconds were required to pass 100 cc. of air through the coated fabric.

EXAMPLES 16–18

Breathable coated fabrics were produced using the method of Example 15 wherein the first coating comprised the non-porous polyurethane films of Example 1 and the second coatings comprised the polymer compositions described in Table II.

TABLE II

| Example No.: | Coating composition |
|---|---|
| 16 | 14 weight percent of a bulk polymerized polyvinyl chloride (Rucon B-20) in 45% of toluene, 45% dimethyl formamide, 10% tetrahydrofuran (all percent by weight). |
| 17 | 20 weight percent cellulose acetate butyrate in 50% toluene, 50% dimethyl formamide (percent by weight). |
| 18 | 90 parts by weight acrylic acid polymer emulsion (Sandoz M49) blended with 10 parts by weight acrylic acid thickening agent (Rohm & Haas ASE60) and sufficient NH₄OH to thicken. |

It is generally contemplated to employ a single polymeric species in each polymer coating in the process of the invention. Mixtures of polymers can also be employed, if desired. However, the polymeric components of any given layer or coating are substantially compatible with one another, that is, the polymeric components are capable of forming a substantially homogeneous mixture. In any event the porosity of the products does not depend on the relative compatability of the polymers. It is understood that various fillers and other additives such as fire retardant additives, slip agents, and the like, which are not compatible with the polymeric components can be employed to provide special properties to the intermediate or final properties.

Various changes and modifications can be made in the process and products of this invention without departing from the spirit and the scope of the invention. The various embodiments of the invention disclosed herein serve to further illustrate the invention but are not intended to limit it.

We claim:
1. A method which comprises the steps of:
   (1) providing a non-porous polymer film which has a softening point of about 50 to about 230 degrees centigrade on a carrier member which possesses a low degree of adhesive affinity for said film;
   (2) applying a coating of a film forming polymer and a liquid diluent therefor to said non-porous film; and
   (3) evaporating the volatile constituents of the resulting composite of said non-porous film and said coating by heating at a temperature which is above the softening point of said non-porous film and which is sufficient to cause bubbles to form during the evaporation of said volatile constituents, to form a unitary, breathable article.
2. The method according to claim 1 which additionally comprises stripping the carrier member from the unitary article.
3. The method according to claim 2 wherein said breathable article has a total thickness of about 1 to 30 mils.
4. A method which comprises the steps of:
   (1) applying a first coating of a film-forming flexible polyurethane and volatile liquid diluent therefor to a carrier member which possesses a low degree of adhesive affinity for said first coating;
   (2) evaporating at least a portion of the volatile constituents of said first coating thereby forming a solidified, non-porous film from the remaining constituents, which film is strippably adherent to said carrier member; and which film has a softening point of about 50 to about 230 degrees centigrade;
   (3) applying a second fluid coating of a film-forming polyurethane and volatile liquid diluent therefor to said non-porous film; and
   (4) evaporating the volatile constituents from the resulting composite of said carrier member, said non-porous film, and said second coating by heating said composite at a temperature which is above the softening point of said non-porous film, and which is sufficiently high to cause bubbles to form in said second coating which operate on the softened non-porous film so the article resulting from the evaporation step is breathable.
5. The method according to claim 4 which additionally comprises stripping the carrier member from the breathable article.
6. The method according to claim 5 wherein said breathable article has a total thickness of about 1 to 30 mils.
7. A method which comprises the steps of:
   (1) providing a non-porous polymer film which has a softening point of about 50 to about 230 degrees centigrade on a carrier member which possesses a low degree of adhesive affinity for said film;
   (2) applying a coating of a film-forming polymer and volatile liquid diluent therefor to said non-porous film;
   (3) laying a fabric material on said coating to interlock the fabric therewith; and
   (4) evaporating the volatile constituents of the resulting composite of said non-porous film and said coating by heating at a temperature which is above the softening point of said non-porous film and which is sufficient to cause bubbles to form during the evaporation of said volatile constituents, thereby forming a unitary, breathable article.

8. The method according to claim 7 which additionally comprises stripping the carrier member from the unitary article.

9. The method according to claim 8 wherein said breathable has a coating with a total thickness of about 1 to 30 mils.

10. A method which comrises the steps of:
   (1) applying a first coating of a film-forming flexible polyurethane and a volatile liquid diluent therefor to a carrier member which possesses a low degree of adhesive affinity for said first coating;
   (2) evaporating at least a portion of the volatile constituents of said first coating thereby forming a solidified, non-porous film from the remaining constituents, which is strippably adherent to said carrier member, and which film has a softening point of about 50 to about 230 degrees centigrade;
   (3) applying a second fluid coating of a film-forming polyurethane and volatile liquid diluent therefor to said non-porous film;
   (4) laying a fabric material on said second coating while said second coating is in the adhesive condition to interlock the fabric therewith; and
   (5) evaporating the volatile constituents from the resulting composite of said carrier member, said non-porous film, said second coating and said fabric material by heating said composite at a temperature which is above the softening point of said non-porous film, and which is sufficiently high to cause bubbles to form in said second coating which operate on the softened non-porous film so the article resulting from the evaporation step is breathable.

11. The method according to claim 10 which additionally comprises stripping the carrier member from the breathable article.

12. The method according to claim 11 wherein said breathable article has a coating with a total thickness of about 1 to 30 mils.

13. The method of claim 12 wherein said first and second coatings comprise a solution of a film-forming, flexible polyesterurethane.

14. The porous, breathable polymer film produced by the process of claim 2.

15. The porous, breathable polymer coated fabric article produced by the process of claim 8.

16. The article of claim 15 wherein said fabric material is cotton.

17. The article of claim 15 wherein said fabric material is open-cell, foamed polyvinyl chloride.

References Cited
UNITED STATES PATENTS

| | | | |
|---|---|---|---|
| 3,681,125 | 8/1972 | Traubel et al. | 117—161 KP |
| 3,687,715 | 8/1972 | Kigane et al. | 117—161 KP |
| 3,574,021 | 4/1971 | Buskirk | 156—79 |
| 3,529,049 | 9/1970 | Abell et al. | 260—112 |

EDWARD G. WHITBY, Primary Examiner

U.S. Cl. X.R.

117—63, 161 KP; 156—77; 161—159, 190; 264—53